United States Patent [19]

Fischer

[11] Patent Number: 4,951,141
[45] Date of Patent: Aug. 21, 1990

[54] METHOD OF DETERMINING THE TRANSMISSION FUNCTION OF A VIDEO CAMERA

[75] Inventor: Walter Fischer, Moosburg, Fed. Rep. of Germany

[73] Assignee: Rohde & Schwarz GmbH & Co. KG, Fed. Rep. of Germany

[21] Appl. No.: 405,220

[22] Filed: Sep. 11, 1989

[30] Foreign Application Priority Data

Oct. 25, 1988 [DE] Fed. Rep. of Germany ....... 3836280

[51] Int. Cl.⁵ ............................................. H04N 17/00
[52] U.S. Cl. ...................................... 358/139; 364/726
[58] Field of Search .................... 358/139, 10; 364/726

[56] References Cited

U.S. PATENT DOCUMENTS

| | | | |
|---|---|---|---|
| 3,952,186 | 4/1976 | Speiser et al. | 364/726 |
| 4,760,447 | 7/1988 | Koka et al. | 358/139 |
| 4,761,685 | 8/1988 | Asaida et al. | 358/139 |
| 4,764,974 | 8/1988 | Woods | 364/726 X |
| 4,811,097 | 3/1989 | Ritter et al. | 358/139 X |
| 4,831,598 | 5/1989 | Koike et al. | 364/726 |

FOREIGN PATENT DOCUMENTS 2431919 1/1976 Fed. Rep. of Germany .
3624585 1/1988 Fed. Rep. of Germany .

OTHER PUBLICATIONS

Fischer, W., "Die Fast-Fourier-Transformation für die Videomesstechnik wiederentdeckt" Fernseh-und Kino-Technik vol. 42, No. 5, 1988, pp. 201-208.

Primary Examiner—James J. Groody
Assistant Examiner—Victor R. Kostak
Attorney, Agent, or Firm—Hill, Van Santen, Steadman & Simpson

[57] ABSTRACT

For determining the transmission function of a video camera, a bar pattern is taken in which the width of the bars is selected to be sufficiently small so that their influence on the amplitude and phase response of the electric pulse that is produced upon scanning of a bar in the camera is negligible; the narrow electric pulses thus produced at the output of the video camera are selected and subjected to Discrete Fourier Transformation.

11 Claims, 1 Drawing Sheet

METHOD OF DETERMINING THE TRANSMISSION FUNCTION OF A VIDEO CAMERA

BACKGROUND OF THE INVENTION

1. Field of the Invention

The invention concerns a method of and an apparatus for determining the transmission function, for example the luminance resolving power, of a video camera by taking (scanning) a bar model.

2. Description of the Prior

For determining the resolving power of a video camera it has been known to take different fine bar models with the camera and to optically analyze the thus produced video signal. This known method permits only the determination of the amplitude response in rough steps while it does not permit determination of the phase response.

SUMMARY OF THE INVENTION

It is therefore the object of the invention to provide a method of determining the transmission function of a video camera, which method permits not only the very simple and accurate determination of the amplitude response but also permits the determination of the phase response or the group delay characteristic, respectively.

According to the invention, a bar pattern is scanned in which the widths of the bars is selected to be sufficiently small so that the influence on the amplitude and phase response of an electrical pulse produced in the scanning television camera upon scanning a bar is negligible. The narrow electric pulses produced at the output of the video camera are subjected to a Discrete Fourier Transformation for determining the transmission function of the video camera.

According to a feature of the invention, the camera scans bars of increasing smaller width from the bar pattern and the minimum bar width desired for the Fourier transformation is selected by analyzing the amplitude of the electric pulses produced at the output of the video camera.

According to another feature of the invention, the distance between the bars is selected to be sufficiently large so that the transient and decay characteristics of the pulses do not influence each other.

According to another feature of the invention the amplitude response and/or the phase response of the video camera are determined by a processor from the complex transmission function obtained by Discrete Fourier Transformation after conversion to magnitude and phase.

According to another feature of the invention, the group delay is computed in the processor by differentiation of the phase response.

According to another feature of the invention, the scan bar pattern comprises at least one vertical black bar on a white background and/or at least one vertical white bar on a black background.

According to another feature of the invention, the bar pattern comprises at least one bar whose width increases to wedge shape in the vertical direction.

According to another feature of the invention, the bar pattern comprises at least one oblique bar.

According to another feature of the invention, a mean value is formed from successively produced pulses of black bars and pulses of white bars after discrete Fourier analysis.

According to another feature of the invention, a mean value is formed either before or after Discrete Fourier Transformation from a plurality of successively produced pulses.

The method according to the invention proceeds from the realization that a video camera when taking a sufficiently narrow bar in case of ideal conversion, i.e. in case of ideal transmission behaviour at the output, will also produce a very narrow electric square-wave pulse in the video signal. This means that, when the camera takes a sufficiently narrow bar and when the width of said bar is so small that its influence on the amplitude and phase response of the electric pulse generated upon time-sequential sampling of the bar in the camera, is very small, viz. smaller than the desired measuring accuracy, the excitation of the camera system will approximately correspond to the excitation by a so-called Dirac pulse, i.e. the spectrum of the optical exciting pulse in the observed frequency band (transmission band of the camera system) has a linear amplitude response and a linear phase response and consequently also a constant group delay. If, for instance, a measuring accuracy of 1% is required, i.e. a measuring error of 1% in the measurement of amplitude response, phase response and group delay, respectively, the influence of the bar width on these unknown quantities must, for example, be less than 0.1%. Under these conditions the system is therefore excited approximately as desired by a so-called Dirac pulse which does not itself exhibit either an amplitude or phase error or a group delay error, respectively, but which is influenced only by the transmission characteristics of the video camera. By proper analysis of the pulse response of the camera system, which is band-limited by the lens, optical pre-filtering, the scanning beam aperture, electric post-amplification, equalization, gamma correction etc., it is then possible directly to derive indications as to the transmission behaviour of the video camera. The desired minimum bar width for generating the sufficiently narrow pulses, the optical excitation of which acts approximately as Dirac pulse, may basically be computed provided the resolving power of the camera system is known, for in a camera exhibiting ideal transmission behaviour the duration in the video signal of the narrow square-wave pulse produced by the bar is substantially less than the reciprocal value of the band width of the camera system. With this dimensioning rule it is also possible to determine the width of the bar which is required so that the camera system is approximately excited by a so-called Dirac pulse and the optical pulse itself does not generate any errors in the amplitude and phase response but will act as an ideal measuring pulse from which only the transmission characteristics of the video camera itself can be recognized and can be determined by subsequent Fourier transformation. The Discrete Fourier Transformation (DFT) has now become quite common in video measuring technique. A suitable computer controlled measuring system is described, for example, in "Neues von Rohde & Schwarz" 121, spring 1988, pp. 34–36, and "Fernseh- und Kino-Technik", 42nd year, No. 5/1988, pp. 201–206. With the here described Fast Fourier Transformation (FFT), which is a fast special case of Discrete Fourier Transformation, it is possible to select a signal section contained in a video signal, i.e. the pulse produced by the narrow bar in the method of the present invention, from the overall signal and to transform it by means of FFT from the time domain to the frequency domain. With FFT one initially obtains the complex transmission function as a Cartesian function. By conversion to the polar mode (Eulerian mode) it is then possible to determine therefrom and to analyze the amplitude response and the phase response of the video camera. By differentiation of the phase response the group delay can be determined.

In the method according to the present invention it is therefore only necessary to use as a model for the video camera a bar pattern which produces a sufficiently narrow pulse at the camera output, the optical excitation of said pulse acting approximately as a Dirac pulse. In practice, this can be effected, for example, by using a model with vertical bars of different widths, while care should be taken that the mutual spacing between these bars is sufficiently large so that the transient and decay characteristics of the pulses successively produced thereby in one line of the video signal do not interfere with and overlap each other. A broad bar will produce a broad electrical pulse with a sharply decreasing frequency response so that it is not directly suitable for the measuring method of the present invention. Therefore, in the method according to the invention pulses of bars becoming gradually narrower, i.e. narrower and narrower pulses, are successively considered. This may be done, for example, by means of an oscillograph connected to the output of the measuring system. When it is found that the amplitude of the pulse of still narrower bars becomes even lower it will have been established that the exciting optical pulse may be considered as a Dirac pulse (in practical use this will be the case when the output pulse initially produced for broader bars has decreased to an amplitude of about 50 to 70% of the initial pulse). When a bar from the model has been selected in this way which is sufficiently narrow to produce a correspondingly narrow electric pulse, the analyzing method according to the invention may be performed. Another possibility of selecting the appropriate optical pulse resides in the use of a model with one vertical bar of varying width in vertical direction, i.e. of a bar shaped like a wedge that tapers from top to bottom, for instance, in which case it is possible to use either a white wedge on black background or a black wedge on white background. In the various horizontal lines of the video signal which scan this wedge there will thus be produced gradually narrowing pulses in the video signal from which the pulse may then be selected which exhibits the characteristics of a Dirac pulse. Another possibility of selecting the sufficiently narrow Dirac pulse resides in that the distance between the camera and the bar model is increased until the camera takes a sufficiently narrow bar.

Basically, the method according to the invention requires only a single white or black bar on a black or white background; but if the width of the bar is not certain initially and must be determined by one of the above-mentioned techniques, it will be advantageous to utilize corresponding models with a plurality of vertical bars and to analyze the multiple different-width pulses produced in the video signal by means of corresponding line selection in the video signal and corresponding locus selection in this line, for example by means of a processor. A bar extending obliquely across the model may also be advantageous to the measuring method of the invention, because it is thereby possible to detect errors of optical pre-filters of a video camera.

In case of a comparative analysis of the pulses produced with a black bar on a white model and with a white bar on a black model it is possible to obtain information as to non-linear influences of the camera system. In accordance with a further improvement of the invention such influences, which may possibly be detrimental, can be eliminated by the feature that from such pulses multiply produced successively by black or white bars, the mean value of the one pulses is formed after invension, which is readily possible in the processor subsequent to FFT analysis. By corresponding averaging of a multiplicity of successively produced pulses in the time domain or the frequency domain it is also possible to eliminate noise influences in accordance with a further improvement of the invention.

The method according to the invention is not only suited for determining the luminance resolving power and the resolving power of the individual colour channels of a video camera with a corresponding black-and-white test picture, but with a corresponding coloured bar model it could also be applied for determining transmission behaviour and crosstalk of the individual colour channels of a colour video camera. By taking and analyzing a grey scale or a wedge at another position in the picture it is possible to effect gamma correction of the measuring pulse (compensation of non-linear distortions of the camera system).

BRIEF DESCRIPTION OF THE DRAWINGS

Other objects, features and advantages of the invention, its organization, construction and operation will be best understood from the following detailed description taken in conjunction with the accompanying drawings, in which.

DESCRIPTION OF PREFERRED EMBODIMENTS

Figure 1:
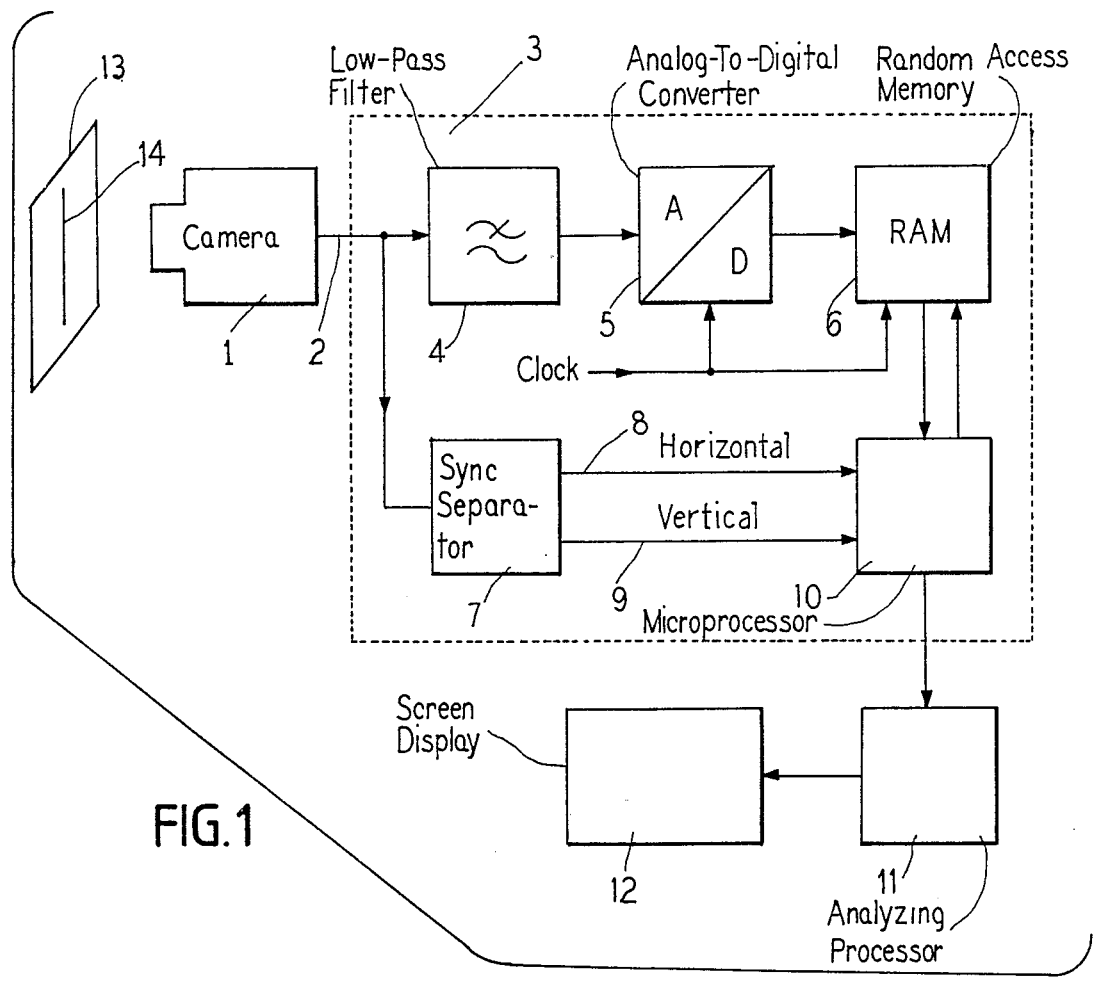
FIG. 1 is a basic circuit diagram of an embodiment of a measuring system for performing the method according to the invention.
Figure 2:
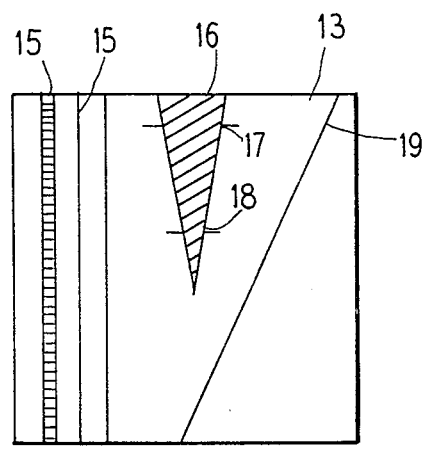
FIG. 2 illustrates various forms of bars for the model used in the method.

FIG. 1. is the basic circuit diagram of a measuring system for performing the method according to the invention. The camera 1 to be tested has its video signal output 2 connected to a digital analyzer 3 of the kind described, for example, in the aforementioned publications. In this analyzer 3 the video signal is amplified, clamped and filtered in a low-pass filter 4 so as to observe the sampling theorem. Subsequently, a freely selectable video line in the video signal is digitalized by means of an analog-to-digital converter 5, and the digital sampling values are stored in a memory 6. Selection of the desired video line is effected by analysis of the horizontal pulses 8 and the vertical pulses 9 from the sync separator 7 by the microprocessor 10. The microprocessor 10 controls the entire digitalizing and storing operation. After completion of this operation the sampling values of a video line are transferred to the analyzing processor 11 where the tested section is selected with the measuring pulse from the video line and is analyzed. The result may either be displayed on a screen display 12 or printed in a printer. The screen display 12 is also used to monitor the selected test line and helps in the selection of a sufficiently short pulse by displaying the time characteristic of the pulse (amplitude analysis).

In front of the camera 1 a model 13 is placed which, for example, comprises only a single narrow vertical black bar 14 on white background. Other possible bar shapes for the model 13 are illustrated in FIG. 1. Thus, the entire model 13 may, for example, be provided with a plurality of vertical bars 15 which may have different bar widths and the spacing between which is sufficiently large so that the decay and transient characteristics of the produced pulses will not interfere with each other. From such a pattern comprising different-width bars 15 the appropriate sufficiently narrow optical pulse can then be chosen in accordance with the above-specified method. The vertical bar may also be provided on the model 13 in the form of a wedge 16; in the scanning line 17 the camera will then produce a wide pulse which becomes gradually narrower with successive downward lines until near the tip a line 18 is found which has a width to produce a Dirac pulse. In simple video cameras a so-called pre-filter is frequently disposed between the lens and the optical transducer, said pre-filter being composed of a grid-like bar pattern. At the cross-over points of this bar pattern broader electric output pulses will always be produced even if a sufficiently narrow bar of the model is taken, which can be detected upon taking an oblique bar 19, i.e. in a camera with a pre-filter corresponding errors of such an optical pre-filter can be detected when such an oblique bar is taken. The bars 14, 15, 16, 19 may either be black on white or white on black, and possibly they may be coloured on a correspondingly coloured contrasting background. Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim:

1. A method of determining the transmission function of a video camera, comprising the steps of:
    scanning a bar pattern with the video camera to produce narrow electrical pulses, the width of the bars of the bar pattern selected to be sufficiently small so that its influence on the amplitude and phase response of an electrical pulse produced in the camera upon scanning of a bar is negligible;
    selecting the narrow electrical pulses thus produced at the output of the video camera; and
    performing a Discrete Fourier Transformation of the selected pulses.

2. The method of claim 1, and further defined as:
    scanning bars of increasingly smaller width from the bar pattern so that the minimum bar width desired for Fourier transformation is selected by analysis of the amplitude of the electric pulses produced at the output of the video camera.

3. The method of claim 1, wherein:
    the distance between the bars of the bar pattern is selected to be sufficiently small so that the transient and decay characteristics of the pulses produced thereby do not influence each other.

4. The method of claim 1, and further comprising the step of:
    determining the amplitude response and/or the frequency response of the video camera with a processor from the complex transmission function obtained by Discrete Fourier Transformation after conversion to magnitude and phase.

5. The method of claim 4, comprising the step of:
    differentiating the phase response in a processor to provide the group delay.

6. The method of claim 1, wherein:
    the bar pattern comprises at least one vertical black bar on a white background and/or at least one vertical white bar on a black background.

7. The method of claim 1, wherein:
    the bar pattern comprises at least one bar whose width increases to wedge shape in the vertical direction.

8. The method of claim 1, wherein:
    the bar pattern comprises at least one oblique bar.

9. The method of claim 1, comprising the step of:
    forming the mean value from successively produced pulses of black bars and pulses of white bars after discrete Fourier analysis.

10. The method of claim 1, comprising the step of:
    forming a mean value from a plurality of successively produced pulses before Discrete Fourier transformation.

11. The method of claim 1, comprising the step of:
    forming a mean value from a plurality of successively produced pulses after Discrete Fourier Transformation.

* * * * *